(12) United States Patent
Ford et al.

(10) Patent No.: US 9,870,230 B2
(45) Date of Patent: Jan. 16, 2018

(54) METHOD AND APPARATUS FOR TUNING A PROCESSOR TO IMPROVE ITS PERFORMANCE

(75) Inventors: Simon Andrew Ford, Cambridge (GB); Stephen John Hill, Grantchester (GB)

(73) Assignee: ARM Limited, Cambridge (GB)

( * ) Notice: Subject to any disclaimer, the term of this patent is extended or adjusted under 35 U.S.C. 154(b) by 1468 days.

(21) Appl. No.: 12/737,476

(22) PCT Filed: Jun. 12, 2009

(86) PCT No.: PCT/GB2009/001503
§ 371 (c)(1),
(2), (4) Date: Mar. 22, 2011

(87) PCT Pub. No.: WO2010/007338
PCT Pub. Date: Jan. 21, 2010

(65) Prior Publication Data
US 2011/0173433 A1     Jul. 14, 2011

(30) Foreign Application Priority Data

Jul. 16, 2008  (GB) .................................. 0813034.6

(51) Int. Cl.
*G06F 9/30*     (2006.01)
*G06F 9/38*     (2006.01)
*G06F 11/34*    (2006.01)

(52) U.S. Cl.
CPC ........ *G06F 9/3844* (2013.01); *G06F 11/3409* (2013.01); *G06F 11/3466* (2013.01); *G06F 2201/81* (2013.01); *G06F 2201/815* (2013.01); *G06F 2201/875* (2013.01); *G06F 2201/88* (2013.01); *G06F 2201/885* (2013.01); *Y02B 60/165* (2013.01)

(58) Field of Classification Search
CPC ..................................................... G06F 9/3844
See application file for complete search history.

(56) References Cited

U.S. PATENT DOCUMENTS

| | | | |
|---|---|---|---|
| 5,937,203 A | 8/1999 | Lee et al. | |
| 6,282,663 B1 | 8/2001 | Khazam | |
| 6,442,652 B1 | 8/2002 | Laboy et al. | |
| 6,671,798 B1 | 12/2003 | Puziol et al. | |
| 6,772,322 B1 | 8/2004 | Merchant et al. | |

(Continued)

FOREIGN PATENT DOCUMENTS

| | | |
|---|---|---|
| WO | WO 03/009134 | 1/2003 |
| WO | WO 2006/130825 | 12/2006 |

OTHER PUBLICATIONS

UK Search Report dated Nov. 6, 2008 in GB 0813034.6.

(Continued)

*Primary Examiner* — John Lindlof
(74) *Attorney, Agent, or Firm* — Nixon & Vanderhye P.C.

(57) ABSTRACT

A data processing apparatus comprising a processor for executing a data processing process and a processor for executing a tuning process is disclosed. The data processing apparatus is arranged such that the tuning process which is a different process to the data processing process can access the parameters of speculative mechanisms of the data processing process and tune the parameters so that the mechanisms speculate differently and in this way the performance of this data processing process can be improved.

8 Claims, 7 Drawing Sheets

(56) References Cited

U.S. PATENT DOCUMENTS

| | | | |
|---|---|---|---|
| 7,130,951 B1* | 10/2006 | Christie et al. | 710/261 |
| 2003/0167389 A1 | 9/2003 | Soltis et al. | |
| 2003/0182542 A1 | 9/2003 | Davies et al. | |
| 2005/0235170 A1 | 10/2005 | Atkinson | |
| 2005/0273310 A1* | 12/2005 | Newburn | G06F 11/3409 703/17 |
| 2006/0174228 A1 | 8/2006 | Radhakrishnan et al. | |
| 2006/0224872 A1* | 10/2006 | Shihadeh | 712/239 |

OTHER PUBLICATIONS

Jiwei et al., Database Inspec [Online], "Design and implementation of a lightweight dynamic optimization system", *The Institution of Electrical Engineers*, No. 6, Apr. 2004, pp. 1-24.

International Search Report for PCT/GB2009/001503, dated Jun. 30, 2010.

Written Opinion for PCT/GB2009/001503, dated Jun. 30, 2010.

* cited by examiner

METHOD AND APPARATUS FOR TUNING A PROCESSOR TO IMPROVE ITS PERFORMANCE

This application is the U.S. national phase of International Application No. PCT/GB2009/001503 filed 12 Jun. 2009 which designated the U.S. and claims priority to GB Patent Application No. 0813034.6 filed 16 Jul. 2008, the entire contents of each of which are hereby incorporated by reference.

FIELD OF THE INVENTION

The present invention relates to the field of data processing and in particular to improving the performance of data processors within multi processor or multi threaded systems.

BACKGROUND OF THE INVENTION

There is a general desire to improve the performance of data processors. Multi-processor and multi threaded processors have been developed to provide an increase in processor performance. Speculative mechanisms have also been introduced into these systems to improve processing speeds. These mechanisms try to predict steps that may need to be performed by the main thread of the process so that these steps can be performed in advance. The results of these operations are then ready when/if they are required by the main thread and processing speeds can thereby be increased. With the advances that have been made in this field, in particular, in caches, branch predictors, prefetchers and multiple-issue policies, the sensible cost benefit and complexity limits for improving performance of these processors using such hardware mechanisms are now approaching.

An alternative way of improving the performance of a processor's speculation is to use software to analyse the performance of a processor and from this analysis works out how the speculation could be improved. To take one example, large programs are known to exhibit phases of execution during which different prediction and prefetch strategies make significant differences to performance. Currently, improving the performance of the processor by exploiting such phases using hardware structures has seen very limited success. Academic research has looked at analysing the program using software and then modifying threads, adding speculation and controlling resources within a thread using software control. A summary of some of these techniques is given in http://ww.cs.ucsd.edu/jbrown/research-exam/talk-print.pdf.

These analyses may result in the execution of a program being changed to improve its performance. Thus, a processing system which is now a combination of hardware and software is provided. One drawback of this is that before a hardware processor is shipped, it is extensively tested to ensure that it operates correctly. Adding software to the processing system means that the previous validation of the hardware system is no longer necessarily correct as the added software is not an integral part of the architecture and thus, one can no longer be sure that the system will always function correctly.

Systems are also known that have self tuning mechanisms built into them, so that they can monitor and then improve their speculation mechanisms. Locating such mechanisms on the processor itself increases the area and power consumption of the processor. One example of such a system is the Alpha 21264 Tournament Predictor, which selects between branch predictions based on local and global histories using a "chooser" that is updated to remember the predictor that was right more often for a given branch see "The Alpha 21264 Microprocessor Architecture" R. E. Kessler, E. J. McLellan 1, and D. A. Webb 1998 IEEE International Conference on Computer Design (ICCD'98).

In the unrelated area of fault diagnosis "The Role of A Maintenance Processor for a general-Purpose Computer System" by Liu, IEEE Transactions on Computers Vol C-33, No. 6 Jun. 1984 discloses a system where one computer performs diagnostic tests on another computer to try to detect and isolate faults.

It would be desirable to be able to improve the performance of a processor without unduly increasing its size and power consumption, and while retaining its validation.

SUMMARY OF THE INVENTION

Viewed from a first aspect, the present invention provides a processor for executing a data processing process, said processor comprising an interface for providing external access to parameters of speculative mechanisms of said data processing process currently executing on said processor such that a tuning process executing externally to said processor can access and tune said parameters of speculative mechanisms of said data processing process so that said mechanisms speculate differently and thereby improve a performance of said data processing process.

The present invention recognises that in multi processor and/or multi threaded systems there is often resource external to the process, this may be idle resource that is not being used due to sequential bottlenecks or variable loading. Thus, it makes use of this resource to analyse and tune a process during normal execution of this process by providing external access to parameters of speculative mechanisms of the process while it is being processed by a processor. This allows these mechanisms to be tuned to improve their performance and thereby the performance of the processor, using resources external to the processor. In this way it does not adversely affect the speed or power consumption of the execution of the process. Furthermore as it is the parameters of the speculative mechanisms that are accessed the performance of the system can be changed but not the end results and thus, the architectural validation of the processor is maintained. This is because the speculative mechanisms are mechanisms that are used to predict how the processor may perform and by doing so hopefully improve its performance. As they are predictions the architecture provides a mechanism to verify at some point that the speculation was correct and if it was not to restore the system to a correct state. Thus, amending these speculative mechanism parameters can improve performance but, as there is a check built into the system, they cannot cause the system to produce an incorrect result value.

An additional advantage of the present invention is that it can also be used to improve the performance of legacy code running on the processor by dynamically tuning speculative mechanisms without modifying the code. Furthermore, as the strategy for improving the performance is decoupled from the processor hardware design the improvement or tuning programs can be decoupled from the programs they are tuning and thus, programs whose code is not accessible can still be tuned.

Although in some embodiments said interface can provide access to other parts of the processor in addition to the parameters of the speculative mechanisms, in some embodiments it does not provide external write access to a critical state of said processor, said critical state being a state whose alteration could cause a program to produce an incorrect result.

Ensuring that the interface does not provide external write access to the critical state of the process, means that one can be sure that the validation performed previously for this processor is not affected by any activities performed via the interface. The critical state of the processor may for example be the architectural state that the processor has been validated for. Thus, it may be its current architectural state or it may be the architectural state that any legacy code uses, i.e. a previously validated state.

In some embodiments, said interface provides access to said parameters of speculative mechanisms, such that at least one of said parameters can be altered to a plurality of different values, said plurality of different values including a value to turn said speculative mechanism on, a value to turn said speculative mechanism off and at least one further value, such that said corresponding at least one speculative mechanism speculates more accurately on average.

The tuning of the processor can be viewed as fine grained tuning in which the speculative mechanisms are not just turned on and off, although this is possible, but also finer changes are made in which the values of the parameters such as the branch prediction algorithms are changed In some embodiments said interface is arranged to provide observation access of at least some of the state of said processor during execution of said data processing process to said tuning process, said state comprising performance counters, PC value, LR value, load addresses and cache misses and evictions.

Although the tuning of the processor and the changes to the parameters can be performed in response to different things, in many embodiments the interface provides observation access to at least some of the state of the processor so that the tuning process can monitor how changes to the parameters of the speculative mechanisms affect the performance of the processor and can respond to these when changing the parameters to improve performance.

In some embodiments, said processor is arranged to operate in a plurality of modes and a plurality of domains, said interface being responsive to at least one of a domain and mode of operation of said processor to inhibit at least one of observation and tuning of said processor via said interface.

It may be advantageous to be able to inhibit access to the processor via the interface when desired. For example, when the processor is operating in say privileged mode, it may be preferable that what it is doing is not externally accessible, thus, it may be advantageous to isolate the observation port of the interface from the processor so that information cannot leak out through this port. Generally in cases where security is more important than improvements in performance then it may be desirable to inhibit observation and/or tuning of the processor.

For example, in some embodiments said processor is arranged to operate in a secure domain and a non-secure domain, said processor when operating in said secure domain having access to secure data which is not accessible to said processor when operating in said non-secure domain, said interface being arranged to inhibit observation and tuning of said processor via said interface in response to detecting said processor operating in said secure domain.

Ensuring that data in the secure domain is kept isolated from external view, is very important and thus, it is advantageous to be able to inhibit external access to the processor via the interface when the processor is operating in a secure domain.

In some embodiments, said speculative mechanism comprises at least one of branch prediction, instruction issue policy, cache victim selection, cache linefill length, number of cache ways, cache write-through or write-back policy, function unit result value speculation, and instruction prefetch and data prefetch.

Although different aspects of the performance of the processor can be improved, in some embodiments said processor performance to be improved comprises at least one of an increase in processing speed and a reduction in power consumption of said processor.

In some embodiments, said processor comprises a data store accessible via said interface for storing amended parameters of speculative mechanisms that have improved performance of at least a portion of said data processing process along with information identifying said at least a portion of said data processing process transferred from said tuning process, said processor being responsive to detecting execution of said at least a portion of said data processing process to access said stored amended parameters and to use these to tune said at least a portion of said data processing process.

The processor may also have a data store that is accessible via the interface and that can store amended parameters for the speculative mechanisms and information identifying at least a portion of the data processing process that these relate to. This data can be transferred from a tuning processor via the interface and can then be used by the data processor when the portion of the program relating to the stored values is identified as being executed, to amend the speculative mechanism parameters to values that are known to improve performance of that portion of the program.

In some embodiments, said information identifying said at least a portion of said data processing process comprises a value identifying an instruction or data address such that in response to said processor accessing said identified address said data processing process is triggered to access said stored amended parameters.

The portion of the data processing process for which parameters are stored may be identified by the process accessing an address. This may be done using a comparator that stores the relevant addresses, an access to one of these addresses triggering the processor to access the stored parameters for use in the speculative mechanisms in that portion of the program.

In some embodiments, said processor has a reset to default mechanism for resetting said speculative parameters to default values in response to at least one of detecting an activity of said processor taking longer than a predetermined time and an accuracy of said speculative mechanism falling below a predetermined threshold, and for isolating said interface from said processor such that said parameters can not be tuned further by said tuning process.

Although changes to the parameters of the speculative mechanisms cannot break the processor and cause it to output something that is not architecturally correct they can cause it to have a drop in performance, sometimes to such an extent that it may fail to make forwards progress, or the speculation may be come very inaccurate, for example the branch predictor may get many of the branches wrong. In such cases, the performance will improve if the device reverts to the default settings. In some embodiments the system therefore has a reset mechanism for recognising when the performance of the processor has fallen below a certain value and in response to this it resets the speculative mechanisms parameters to default values and disables the future tuning of the processor for at least a while.

A second aspect of the present invention provides a data processing apparatus comprising a processor for executing a data processing process and a processor for executing a tuning process, said data processing apparatus being arranged such that said tuning process can access said parameters of speculative mechanisms of said data processing process and tune said parameters so that said mechanisms speculate differently and thereby improve a performance of said data processing process.

As noted for the first aspect of the present invention a tuning process that executes independently to the data processing process it is seeking to improve, can be useful when seeking to improve performance of this process without using resources it may need. Thus, using a different process to amend the parameters of the speculative mechanisms of a data processing process can improve its performance without affecting the end results and thereby the architectural validation of the processor is maintained.

In some embodiments said processor for executing said data processing process and said processor for executing a tuning process are a same processor, said process for processing data and said tuning process being different threads executing on said same processor.

Embodiments of the present invention are particularly applicable to multi threaded/multi processor systems. In such systems there may be some processing resource available that is separate to the resource running the process to be improved. Thus, spare resource that is not currently being used to execute the process can be used to analyse it and work out how to improve its performance. This spare resource may be on a different processor or it may be spare cycles on the same processor that is executing the process and thus, the tuning process can be executed as a separate thread on this processor, with the tuning process being provided with access to certain registers of the main process that it is tuning. For example, the processor may be a virtual machine that is a processor mimicking a plurality of processors. It should be noted that multi threaded machines typically use the same registers for all threads, thus, the tuning mechanism changing a value stored in a register may affect the tuning thread itself as a byproduct. If this is not desirable then the tuning mechanism may be adapted to provide separate tuning registers for each thread.

A third aspect of the present invention provides a data processing apparatus according to a second aspect of the present invention, comprising a processor for executing said data processing process according to a first aspect of the invention, and a tuning processor for executing said tuning process, said tuning processor being in data communication with said interface of said processor for executing said data processing process.

In some embodiments the tuning process runs on a processor that is separate to the processor running the process to be tuned. In such a case the processor running the process to be tuned has an interface that allows a further processor in this case the one running the tuning process to access its parameters of speculative mechanisms. Thus, these can be changed by an external tuning process which does not use any of the resource of the process it is tuning and which does not affect the validation of this device. This tuning process amends the parameters of speculative mechanisms of the main process, these speculative mechanisms being by their very nature subject to verification. The tuning processor could be a general purpose processor that has some spare resource or it could be a processor that has been designed for tuning processors and is dedicated to this task. It could be used for tuning one or more processors or it could be used for tuning a particular aspect of one processor with other processors present in the apparatus being used to tune other aspects.

In some embodiments, said tuning process is arranged to receive observation data from said data processing process and is responsive to said observation data to amend said parameters of speculative mechanisms of said process so that they speculate differently and thereby improve performance of said process.

The tuning process generally receives observation data from the processor executing the process to be tuned and uses these values when deciding on how to amend the parameters of the speculative mechanisms.

In some embodiments, said processor for executing said tuning process comprises a data store for storing amended parameters of speculative mechanisms that have improved performance of at least a portion of said data processing process along with information identifying said at least a portion of said data processing process, said tuning process being responsive to detecting execution of said at least a portion of said data processing process to access said stored amended parameters and to use these to tune said at least a portion of said data processing process.

In addition to observing the processor processing the data processing process and amending the parameters to improve performance in this way, the tuning processor may also store values that have previously been calculated to improve performance along with information identifying the portion of the process that these values were used to improve. In this way, if the process is executed continually, a portion that has previously been tuned can be recognised and the stored parameters can be used, rather than them being recalculated each time this portion runs.

In some embodiments, the stored parameters are stored in said data store by said tuning processor having been calculated during a previous tuning of the process being executed.

In other embodiments, said processor for executing said tuning process comprises a port for receiving said amended parameters of speculative mechanisms that have improved performance of said at least a portion of said data processing process along with information identifying said portion of said process, said tuning processor being arranged to store said received amended parameters in said data store.

The stored parameters can be input from an external port. For example, they may be uploaded from the internet if such information is available for a particular program that is to be run.

A fourth aspect of the present invention provides a method of tuning a processor executing a data processing process comprising the steps of: observing execution of said data processing process; accessing parameters of speculative mechanisms of said process executing on said processor via an interface that does not allow access to an architectural state of said processor; tuning said parameters of speculative mechanisms of said process so that said mechanisms speculate differently and thereby improving a performance of said process.

A fifth aspect of the present invention provides a computer program which is operable when run on a data processing apparatus to control the data processing apparatus to perform the steps of the method according to a fourth aspect of the present invention.

BRIEF DESCRIPTION OF THE DRAWINGS

The present invention will be described further, by way of example only, with reference to embodiments thereof as illustrated in the accompanying drawings, in which.

DESCRIPTION OF THE PREFERRED EMBODIMENTS

Figure 1:
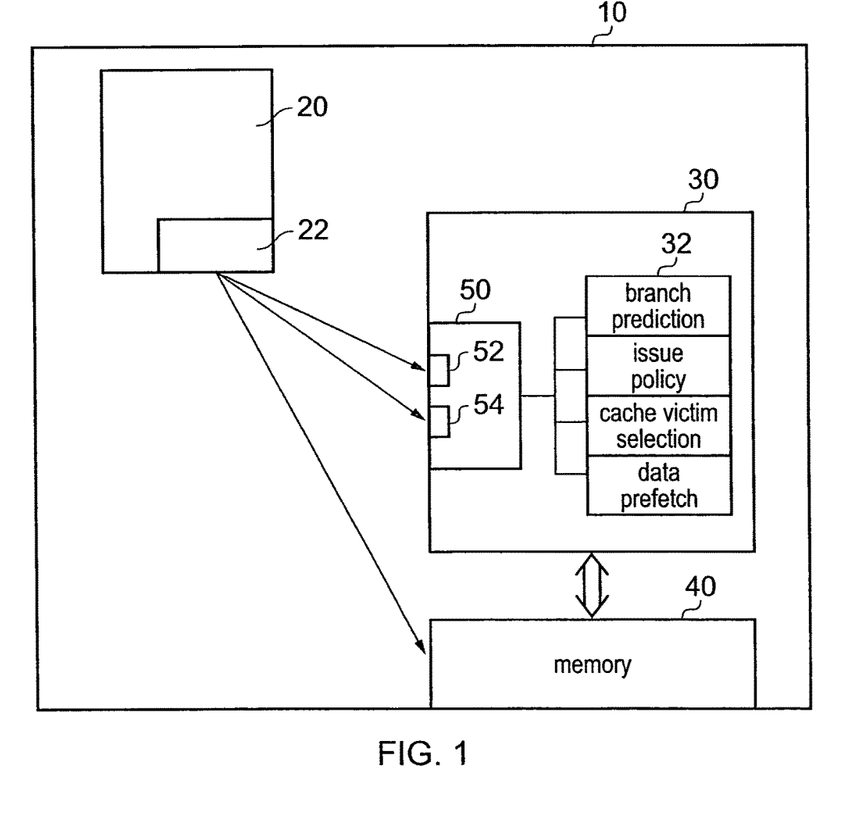
FIG. 1 shows a data processing apparatus or system according to an embodiment of the present invention.

FIG. 1 shows a data processing apparatus 10 having a tuning processor 20 for observing and tuning a process executing on a main processor 30. The apparatus 10 also comprises memory 40 that both the tuning processor 20 and the main processor 10 have access to. The tuning processor 20 has an observe/tuning interface 22 through which it receives observation data and outputs tuning data. This interface 22 is connected to an interface 50 of the main processor 30. This interface 50 exposes the speculative mechanisms 32 of the main processor 30 to an external process connecting to it. Interface 50 comprises two ports, a tuning port 52 through which tuning data can be received and an observation port 54 that outputs observation data.

The main processor 30 is shown schematically as having a plurality of speculative mechanisms that operate during processing of a data processing process and which in this case are branch prediction, issue policy, cache victim selection and a data prefetcher. The tuning port 52 and observation port 54 each have access to these speculative mechanisms. The observation port has read access to observe these processes and the tuning port also has write access to some of the parameters that affect how these speculative mechanisms operate. The observation port may also have access to other things, such as for example performance counters.

Thus, the tuning processor can observe the main processor executing a program via observation port 52 and can amend parameter values of the speculative mechanisms 32 via tuning port 54 and can observe the results of these changes. In this way it can improve the performance of the main processor, either by increasing its speed of operation or decreasing its power consumption. By providing the tuning process on a processor 20 separate from the main processor 30 the processing power that it itself requires is not taken from the main processor and thus does not adversely affect the process it is seeking to improve. Furthermore, amending the parameters of the speculative mechanisms can change the performance of the main processor but its semantics will be protected. This is because at the end of the speculation the main processor will always check that the speculation is correct and if it is not it will restore the correct values. Thus, the processor that has been validated is not invalidated by access to the parameters of the speculative mechanism being provided to an external agent although its performance can be improved.

It should be noted that tuning processor 20 may be a processor used for other functions as well as for tuning, or it may be a processor designed for and dedicated to tuning. Furthermore, although it is only shown as tuning processor 30 in this figure, it may be used for tuning other processors (not shown) that are present on apparatus 10. These other processors also have interfaces with tuning and observation ports to communicate with tuning processor 20. It should also be noted that as well as additional processors 30 to be tuned, there may in some embodiments be several tuning processors 20. These may each individually tune different processors or they may each tune different aspects of one processor.

Figure 2:
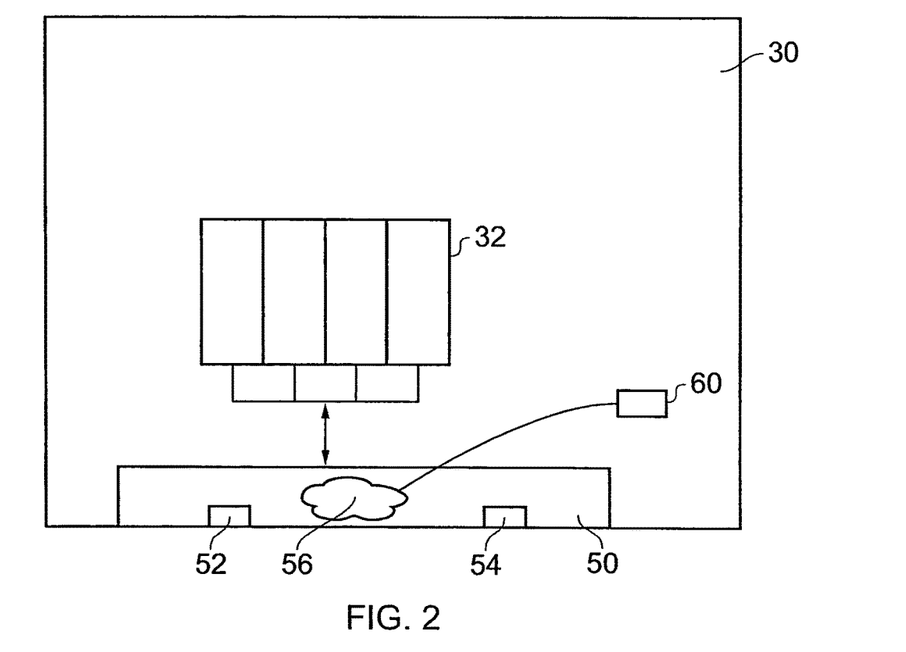
FIG. 2 shows a data processor according to an embodiment of the present invention.

FIG. 2 shows an alternative embodiment of main processor 30, having interface 50 with tuning port 52 and observation port 54. Interface 50 also comprises logic 56 for detecting the mode of operation and the domain of operation of main processor 30. In this embodiment main processor 30 can operate in a secure domain and a non-secure domain. Operating in the secure domain the processor 30 has access to secure data that is not accessible from the non-secure domain. Operation of the processor in the secure domain is indicated by setting the secure or S bit in register 60. Thus, logic 56 monitors register 60 and in response to detecting that the S bit is set, disables ports 52 and 54 of the interface so that the processor can no longer be tuned or observed. This inhibits leakage of secure data from the processor, however, it also prevents the processor from being tuned. Thus, in addition to inhibiting access to the processor via port 52 and 54, logic 56 also instructs the speculative mechanisms 32 to set their parameters to their default values, thus, ensuring that any values that may have been set midway through a tuning process are overwritten to the default values of the processor. This also prevents any information leaking as it stops someone running code that will cause the processor to be tuned a certain way and then seeing how that tuning effects the run time of the secure code.

Figure 3:
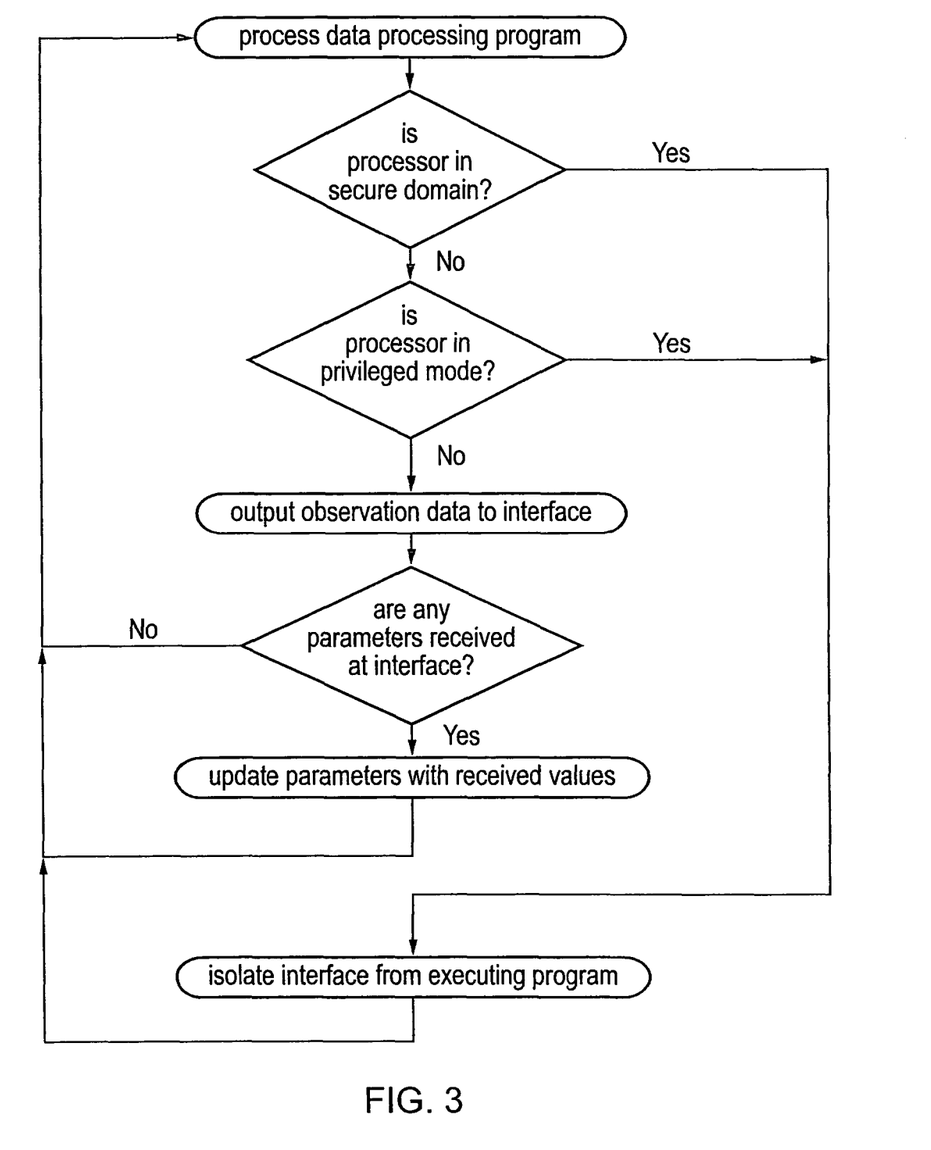
FIG. 3 shows a flow diagram illustrating steps in a method being performed by a processor having a secure and non-secure domain that is being tuned by an external process.

FIG. 3 shows a flow diagram illustrating steps in a method performed on a processor having a secure and non-secure domain that is being tuned by an external processor. Although the steps are shown as sequential, it should be understood that in reality several of the steps could be performed in parallel with each other.

Initially the main processor starts by processing the data processing program that is to be tuned. While it is being processed the data processor is constantly detecting to see if the processor is in the secure domain. If it detects that it is then it isolates the interface from the executing program so that no data can be output by the interface. It may also reset any parameters that have been overwritten during tuning to be set to their default values although this step is not shown. If it detects that it is not in the secure domain it then looks to see if the processor is operating in a privileged mode such as supervisor mode. If it is, then again it isolates the interface from the executing program as this too is a mode of operation from which information should not be allowed to leak (and possibly resets parameters to default values). If it detects that it isn't operating in either a privileged mode or a secure domain i.e. it is executing in non-secure domain and user mode then it allows observation data to be output to the interface. This observation data indicates the state of the processor, and could be many different things, but may for example be a value of a performance counter. The processor also looks to see if there are any parameters received at the tuning port of the interface. If there are then it updates the parameters of the corresponding speculative mechanism with the received values and continues processing. Observation values for operation with the updated parameters are then output, unless of course the processor enters privileged mode or a secure domain.

Figure 4:
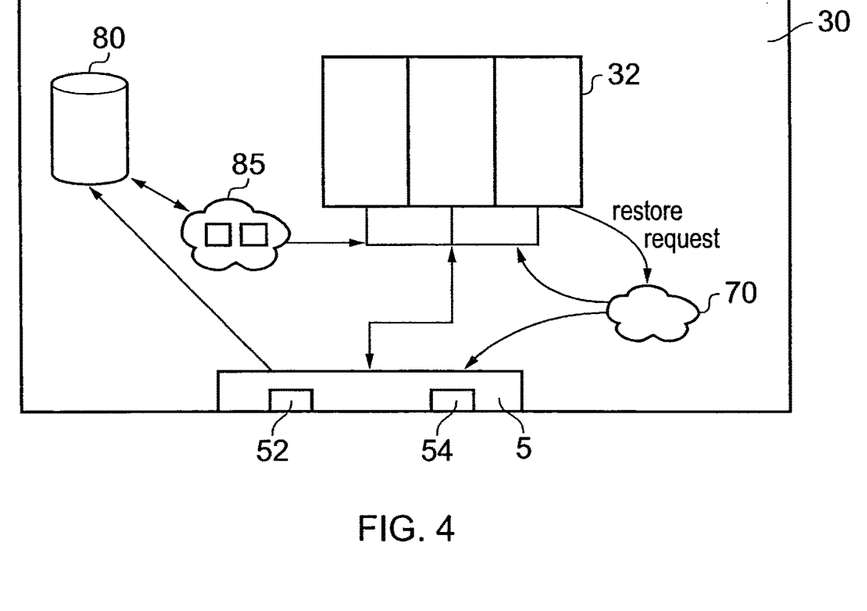
FIG. 4 shows a data processor according to another embodiment of the present invention.

FIG. 4 shows a data-processor 30 according to a further embodiment of the present invention. Data processor 30 has speculative mechanisms 32 and comprises interface 50 with a tuning port 52 and an observation port 54. Processor 30 additionally has reset logic 70 and a data store 80 along with trigger logic 85. Data store 80 stores tuning data that has been received at tuning port 52. This data relates to parameters of the speculative mechanisms and an indication of the portion of the program that these are relevant to. Thus, results from previously detected programs that have been run and whose performance has been optimized or at least improved by the tuning processor are stored here. In order to be able to identify the program or portion of the program that they are relevant to triggers are stored alongside the data. These identify a portion of a program that is executing and for which values are stored and trigger the updating of the relevant parameters with those stored. These triggers may comprise addresses of instructions or data, thus any access to one of these addresses indicates that the portion of the program for which there are stored parameters is being executed. Thus, a comparator may be used to compare addresses to be accessed with those stored and detection of a match triggers the data store 80 to be accessed and the parameters stored therein to be used to update the parameters of the speculative mechanisms.

The main processor 30 additionally has reset logic 70. Although, the tuning of the parameters of the speculative of mechanisms cannot actually break the processor in that they cannot make it generate a wrong result, they can affect its performance, and they can affect its performance so badly that it hangs and thus, although it does not produce an incorrect answer it may produce no answer at all. In order to prevent this from happening, this processor has reset logic 70 which is operable to detect the performance of one of the speculative mechanisms dropping below a predetermined value and in response to this it is operable to isolate interface 50 from the speculative mechanisms and to instruct the speculative mechanisms to restore their parameters with default values. This may be done by, the speculative mechanism itself issuing a restore request to logic 70 when its performance drops beneath a certain value.

Figure 5:
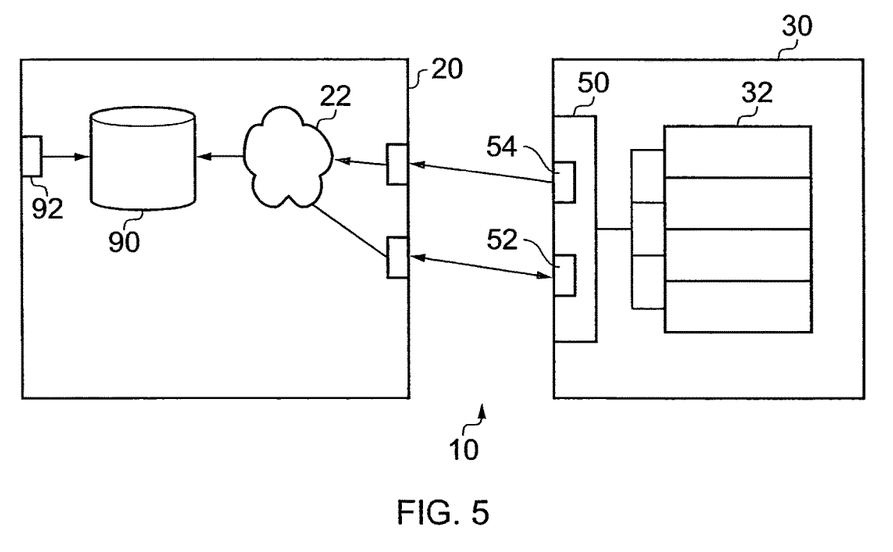
FIG. 5 shows a system having a main processor and a tuning processor according to an embodiment of the present invention.

FIG. 5 shows a system 10 comprising main processor 30 and tuning processor 20. Tuning processor 20 accesses main processor 30 via interface 50. Interface 50 has tuning port 52 and observation port 54. Tuning processor comprises tuning logic 22 and a data store 90. It also comprises port 92. Tuning processor 20 executes tuning logic to run a tuning process that generates parameters for speculative mechanisms of the main processor 30 and receives observation data from main processor 30 which it looks at and uses to make decisions on how to alter the parameters to improve performance of processor 30.

The tuning logic also comprises a data store 90 which contains stored parameter values. These stored parameter values relate to portions of programs or whole programs that have been executed before and they are stored alongside information identifying these programs or portions of programs. These parameters may be parameters that have previously been calculated by the tuning logic 22 and have been stored to be used again or they may be values that have been uploaded from, for example, the Internet and have been input into tuning processor 20 via port 92. In either case, they are stored alongside a value that indicates whether or not they are values that are considered to be optimal and that therefore cannot be improved by further tuning, or whether they are values that require further tuning.

When tuning the process, tuning logic 22 may recognise a portion of the program running on the main processor for which it has parameter values stored in data store 90. In such a case it will amend the parameter values of the speculative mechanisms to the values stored in data store 90. It will also look to see if these values are optimal values or not. If it detects that they are not optimal values then it will continue to tune the main process by changing the parameters and looking to see if the performance is improved. If the performance is improved then it will update its stored values with the new values. If it reaches a point where it can no longer improve the performance by changing the parameters then it will store an optimal value indicator alongside the parameters.

Port 52 can also be used to receive a set of tuning rules for specific applications that the tuning logic is to tune. This allows the tuning logic to tailor a processor's execution without having to re-compile and re-distribute these applications or even in extreme cases have access to the source code.

Figure 6:
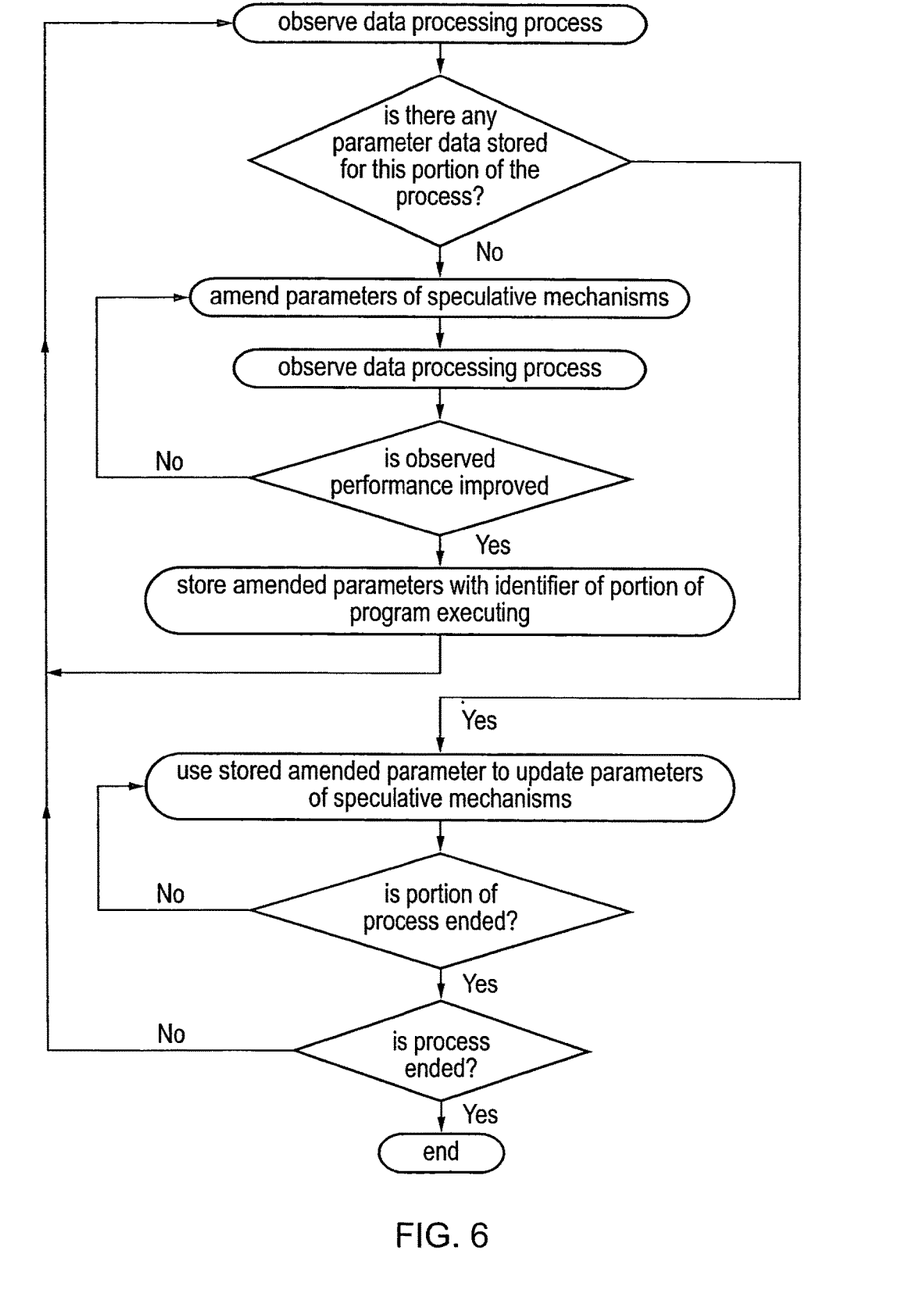
FIG. 6 shows a flow diagram showing steps performed by a system such as that illustrated in FIG. 5.

FIG. 6 shows a flow diagram showing steps performed by a data processing apparatus such as that illustrated in FIG. 5. Although these are shown as sequential steps this is for ease of illustration and it should be clear to a skilled person that many of these steps can be performed in parallel. The data processing process is observed by the tuning process which looks to see if it has any parameter data stored for this particular portion of the process. If it doesn't then it amends the parameters of the speculative mechanisms and observes the data processing process and if the performance improves it stores the amended parameters with identifiers of the portion of the program executing, it then observes the data processing process again to see if there is any parameter data stored for the next portion of the process. If there is parameter data stored then it uses the stored parameters to update parameters of the speculative mechanisms. It then looks to see if the portion of the process is ended and if it has then it looks to see if the process has ended and if it has then that is the end.

It should be noted that in addition to just storing the parameters, information as to whether or not they are optimal parameters can also be stored. In the flow diagram given here it is assumed that it is the optimal parameters that are stored. It should be clear that if these parameters are not marked as optimal then in addition to updating the parameters of the speculative mechanisms with the stored ones they will then be further tuned and the data processing process observed to see if the performance is improved and if it is then these stored parameters can be updated. When no further improvement is seen then an indication that the parameters are at their optimal value is stored alongside the values.

Figure 7:
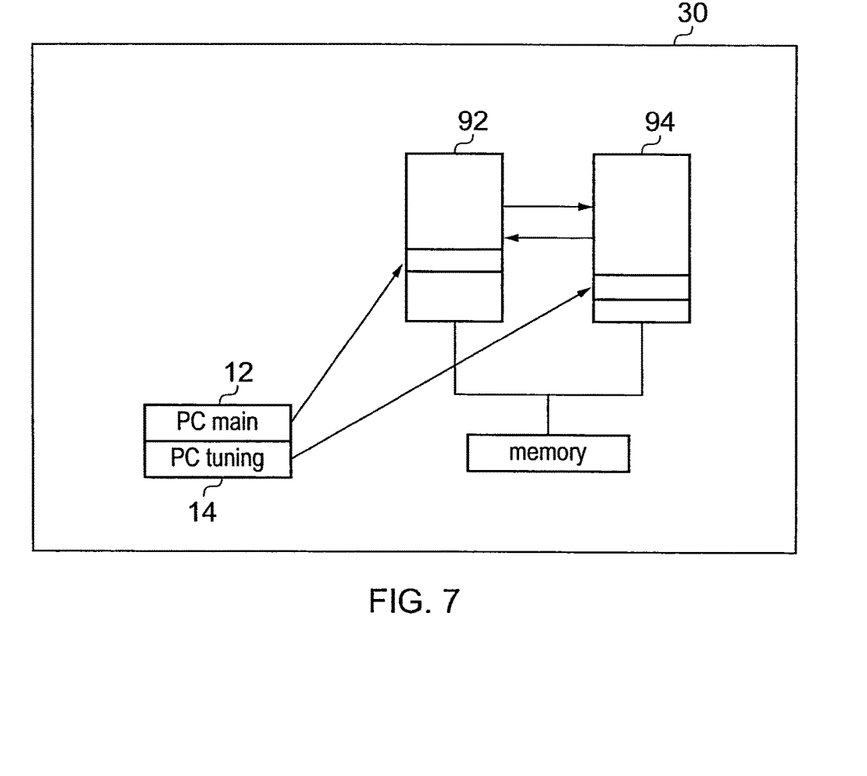
FIG. 7 shows schematically a data processor that comprises both the main processing thread that is to be tuned and the tuning thread.

FIG. 7 shows schematically a data processor 30 that comprises two threads, a main processing thread 92 that is to be tuned and a tuning thread 94. An example of a multi threaded machine that is in fact a single processor but mimics the operation of several processors. Such a processor will have several program counters 12, 14 each pointing to the current instruction to be executed of their own thread.

In this embodiment there are two program counters as there are two threads. One program counter 12 points to an instruction to be executed in the main thread and one program counter 14 points to an instruction in tuning thread 94. Execution of main thread 92 takes preference over tuning thread 94, but if it is stalled waiting for some resource or result, then tuning thread 94 can take advantage of the empty cycles in the main thread and use these unused resources to tune the main thread until the main thread requires these resources again.

Various further aspects and features of the present invention are defined in the appended claims. Various modifications can be made to the embodiments hereinbefore described without departing from the scope of the invention as defined in the claims.

The invention claimed is:

1. A processor for executing a data processing process, said processor comprising:
   an interface configured to provide a tuning process external to said processor with observational access to at least some of a state of said processor during execution of said data processing process and output access to output tuning data relating to parameters of speculative mechanisms of said processor,
   wherein, through said interface, said tuning process accesses observational data relating to at least some of the state of said processor and tunes said parameters of speculative mechanisms of said processor, so that said mechanisms speculate differently and thereby improve a performance of said processor,
   wherein a critical state of said processor is unaltered by said tuning of said parameters, said critical state being a state whose alteration causes a program executing on said processor to produce an incorrect result.

2. A processor according to claim 1, wherein said interface provides access to said parameters of speculative mechanisms, such that at least one of said parameters can be altered to a plurality of different values, said plurality of different values including a value to turn said speculative mechanism on, a value to turn said speculative mechanism off and at least one further value, such that said corresponding at least one speculative mechanism speculates more accurately on average.

3. A processor according to claim 1, said state comprises one or more of performance counters, PC value, LR value, load addresses and cache misses and evictions.

4. A processor for executing a data processing process, said processor comprising:
   an interface configured to provide a tuning process external to said processor with observational access to at least some of a state of said processor during execution of said data processing process and output access to output tuning data relating to parameters of speculative mechanisms of said processor,
   wherein, through said interface, said tuning process accesses observational data relating to at least some of the state of said processor and tunes said parameters of speculative mechanisms of said processor, so that said mechanisms speculate differently and thereby improve a performance of said processor,
   wherein said processor is configured to operate in a plurality of modes and a plurality of domains, said interface, responsive to at least one of said domains and modes, is configured to inhibit at least one of observation and tuning of said processor via said interface;
   wherein said processor is configured to operate in a secure domain and a non-secure domain, said processor, when operating in said secure domain, having access to secure data which is not accessible to said processor when operating in said non-secure domain, said interface is configured to inhibit at least one of observation and tuning of said processor via said interface in response to detecting said processor operating in said secure domain.

5. A processor according to claim 1, wherein said speculative mechanism comprises at least one of branch prediction, instruction issue policy, cache victim selection, effective cache linefill length, effective number of cache ways, cache write-through or write-back policy, function unit result value speculation, instruction prefetch and data prefetch.

6. A processor according to claim 1, said processor comprising a data store accessible via said interface for storing amended parameters of speculative mechanisms that have improved performance of at least a portion of said data processing process along with information identifying said at least a portion of said data processing process transferred from said tuning process, said processor being responsive to detecting execution of said at least a portion of said data processing process to access said stored amended parameters and to use these to tune said at least a portion of said data processing process.

7. A processor according to claim 6, wherein said information identifying said at least a portion of said data processing process comprises a value identifying an instruction or data address such that in response to said processor accessing said identified address said data processing process is triggered to access said stored amended parameters.

8. A processor for executing a data processing process, said processor comprising:
   an interface configured to provide a tuning process external to said processor with observational access to at least some of a state of said processor during execution of said data processing process and output access to output tuning data relating to parameters of speculative mechanisms of said processor,
   wherein, through said interface, said tuning process accesses observational data relating to at least some of the state of said processor and tunes said parameters of speculative mechanisms of said processor, so that said mechanisms speculate differently and thereby improve a performance of said processor,
   said processor having a reset to default mechanism configured to reset said speculative parameters to default values in response to at least one of detecting an activity of said processor taking longer than a predetermined time and an accuracy of said speculative mechanism falling below a predetermined threshold, and configured to isolate said interface from said processor such that said parameters cannot be tuned further by said tuning process.

\* \* \* \* \*